June 21, 1966     N. C. SCHUTT ET AL     3,256,794

PHOTOMECHANICAL CAMERA WITH PLURALITY OF FILM HOLDERS

Filed Jan. 24, 1964     9 Sheets—Sheet 1

INVENTORS
NORMAN C. SCHUTT
FLOYD W. FLYNN
BY JOHN L. BJELLAND

Morgan, Finnegan, Durham & Pine
ATTORNEYS

INVENTORS
NORMAN C. SCHUTT
FLOYD W. FLYNN
JOHN L. BJELLAND
BY
Morgan, Finnegan, Durham & Pine
ATTORNEYS

INVENTORS
NORMAN C. SCHUTT
FLOYD W. FLYNN
JOHN L. BJELLAND
BY
Morgan, Finnegan, Durham & Pine
ATTORNEYS

INVENTORS
NORMAN C. SCHUTT
FLOYD W. FLYNN
JOHN L. BJELLAND
BY
Morgan, Finnegan, Durham & Pine
ATTORNEYS

United States Patent Office

3,256,794
Patented June 21, 1966

3,256,794
PHOTOMECHANICAL CAMERA WITH
PLURALITY OF FILM HOLDERS
Norman C. Schutt and Floyd W. Flynn, Glen Cove, and John L. Bjelland, Glen Head, N.Y., assignors to Power Chemco, Inc., Glen Cove, N.Y., a corporation of New York
Filed Jan. 24, 1964, Ser. No. 340,034
17 Claims. (Cl. 95—31)

The present invention relates generally to photomechanical cameras of utility especially in the graphic arts or process-photography field, and relates more particularly to certain new and useful improvements in provisions and facilities for the storage in such cameras of a supply of different types of film in continuous strip form and for the selection and transfer of film of desired type from such supply to exposure position within the camera.

It is often desirable in graphic arts or process photography to have a camera provided with film in several different types. These types may differ from each other in various individual characteristics such, for example, as in size, speed, quality and/or cost. Such an arrangement provides the photographer with flexibility in the photographs he can take in that, for example, he can use a roll of cheap film for type and a roll of film of better quality, or of different size, for plates, thus avoiding the necessity of re-loading the camera on each occasion when a different type, size, or quality of film is desired.

Heretofore, it has been customary to employ a roll film dispenser mounted externally of the camera, wherein the film rolls were stored individually, one above the other. In such film dispensers, separate feed rollers were required for each film roll and special feed control devices were utilized to ensure that only the selected film was fed by the selected feed rollers. A length of the selected film was then cut from the roll to provide a film sheet and transferred by the operator to exposure position within the camera.

The present invention is characterized by a novel and improved camera construction wherein a plurality of roll film holders adapted to be loaded with the same or different types of film are supported on a rotatable carriage which is mounted for rotation in a magazine at the top of the camera. The film holders have their individual longitudinal rotational axes lying in a common plane and are disposed symmetrically around the rotational axis of the carriage. The carriage itself is rotatable about a vertical axis and means are provided for indexing the carriage to present a selected roll of film carried by one of said film holders, to a common film feed station of the camera. At the film feed station, means are provided for actuating film feed means associated with the carriage to feed a measured length of film from the roll in the magazine into exposure position in the camera in juxtaposition with the camera film-support.

Cutting means are provided in the camera at the feed station for severing the positioned measured length of film from its associated roll. A novel film return or rewind means automatically reverses rotation of the film feed when indexing to another station. This reversal of rotation rewinds the film from the camera and continues until the leading edge of the film is withdrawn into the magazine clearing the carriage for rotational movement and thereby readying it for indexing to present a second selected roll to the film feed station.

It will be understood that the entire camera and film supply magazine are enclosed in a light-tight container with the operating elements for the magazine, located on the outside of the container. Also there are provided film roll indicators on the outside of the container one of which visually indicates which of the rolls of film is disposed at the feed station, while another associated with the film feed means, visually indicated the length of film strip fed.

The camera embodying the present invention results in a structure that is more economical to construct and maintain.

It is among the objects of this invention to provide a novel photomechanical camera wherein different types of film in continuous strip form are individually stored in a supply magazine and are selectively transferable from such magazine to exposure position within the camera without separate sets of film feed means being required for each film type stored.

Another object of the present invention is to provide in a novel photomechanical camera construction a film supply magazine for storing a plurality of rolls of film and for presenting singly from the stored rolls, a selected roll of film to a film feed station in the camera.

A further object of the present invention is to provide a novel photomechanical camera having a film supply magazine thereon adapted to present a selected one of a plurality of film rolls stored therein to a film feed station in the camera, feed means for feeding film from the selected roll into juxtaposition with the camera film-support and means at the feed station for cutting a measured length from the leading end of the film being fed.

Another object of this invention is to provide a photomechanical magazine camera having a rotatable film supply carriage for a plurality of film supply rolls, means for indexing said carriage to present a selected one of said rolls to a film feed station of the camera, novel feed means for feeding a measured length of the selected film at the feed station through a cutting station into juxtaposition with the camera film-support and means for cutting said measured length from its associated roll, including means for automatically reversing the feeding means to rewind the film into the magazine and prior to indexing the magazine to present another roll of film into position at the film-feeding station.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

GENERAL CAMERA DESCRIPTION

Figure 1:
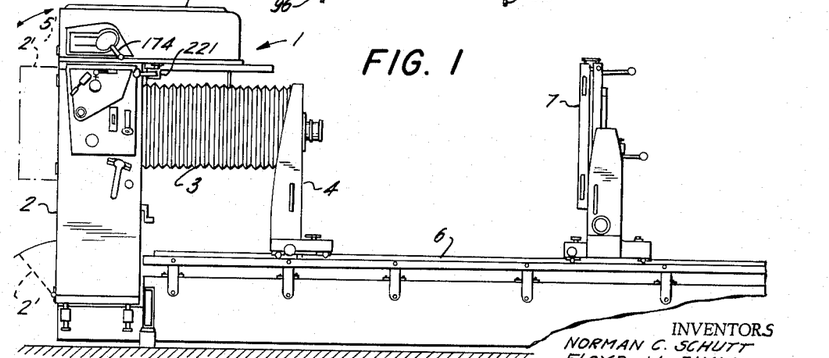
FIG. 1 is a side elevation of a photomechanical camera construction embodying this invention.
Figure 11A:
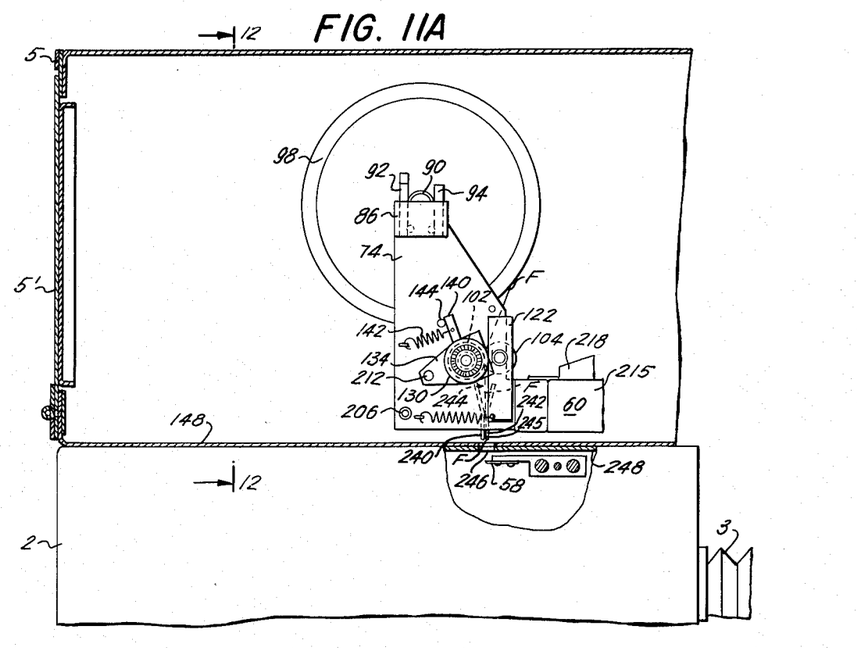
FIG. 11A is a view in side elevation of the camera construction of FIG. 1 with the magazine housing in section to show details of one of the magazine roll film holders.
Figure 11B:
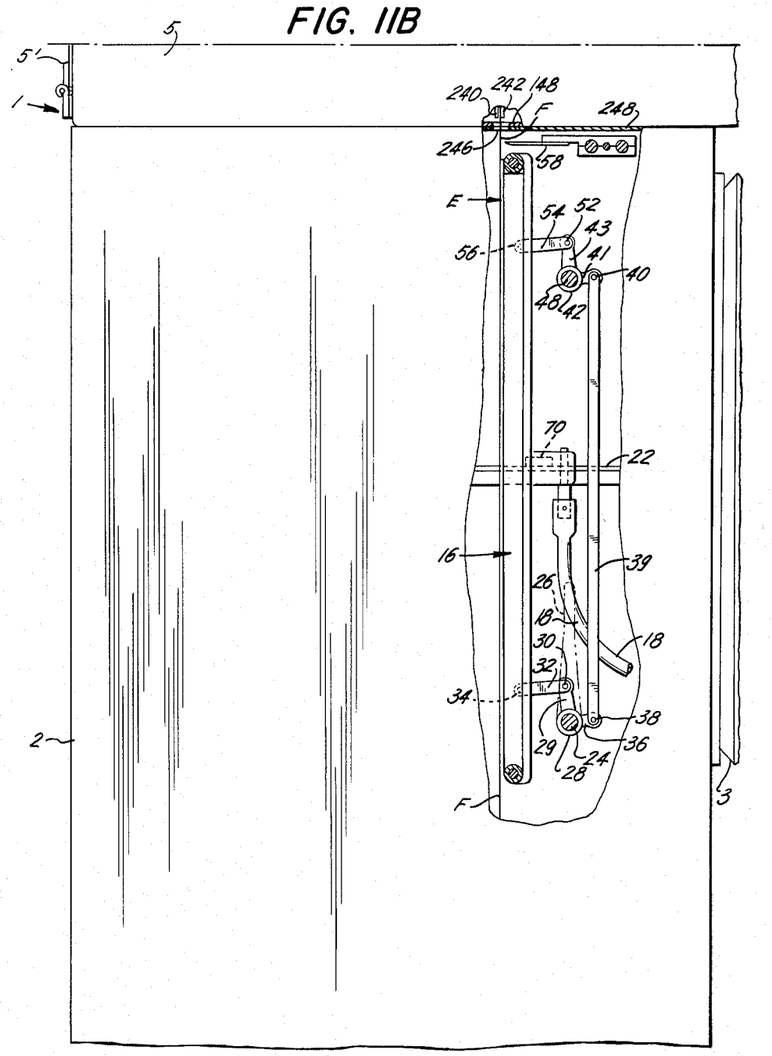
FIG. 11B is a view in side elevation, partly in section, of the camera construction of FIG. 1, a portion of the camera housing being broken away to show details of the film support structure.

Referring now more particularly to the embodiment of the invention shown in the accompanying drawings there is illustrated in FIG. 1 a photomechanical camera, designated generally 1, having a stationary camera box section 2, and expandable bellows section 3, a lens-shutter board section 4, and a film-supply section 5. The lens-shutter board section is mounted on a track 6 for sliding movement fore and aft relative to the stationary camera box section, as is a work holder 7. The camera box section 2 and film-supply section 5 are preferably operably associated with a dark room and have hinged doors 2' and 5' in their rear walls providing access to the interior of the camera box and film supply sections from the dark room. Camera box section 2 houses film support means as is best shown in FIG. 11B, comprising a focal plane vacuum film support 16 associated with suction conduit 18 connected to a suitable source of suction (not shown). Film F from the film supply section 5 is fed from the latter through suitable aligned openings into the camera box section at the exposure station E thereof.

Vacuum film support 16 is mounted for fore and aft movement into and out of its designed focal plane position shown in FIG. 11B, by means of oppositely disposed lugs 20 located on opposite sides thereof, which seat slidably on associated guideways 22 fixed to the inner face of opposite side walls of camera box section 2.

Means are provided for moving support 16 to and fro in camera box section 2. To this end, a shaft 24 is rotatably carried in suitable coaxial bearings (not shown) fixed to the side walls of the camera box section. Shaft 24 has provided thereon at one end exteriorly of the camera box section an actuating handle 26 which adapts shaft 24 for limited angular oscillatory movement.

Inside camera box section 2, and adjacent its opposite side walls, shaft 24 has mounted thereon at each end for rotation therewith, a bell crank 28 whose arm 29 is pivotally connected by pin 30 to one end of a link 32 which, in turn, is pivotally attached at its other end by a pin 34 to film support 16 adjacent the bottom portion thereof.

Arm 36 of bell crank 28 is pivotally connected by pin 38 to one end of a link member 39 which, in turn, is pinned at its other end by pin 40 to one end of an arm 41 of bell crank 42. The latter is fixed to shaft 48 journalled in suitable coaxial bearings (not shown) fixed to the side walls of the camera box section, so that the shaft 48 lies in space parallel relationship to shaft 24 and, like shaft 24, is adapted for limited angular oscillatory movement.

Bell crank arm 43 is pivotally connected by a pin 52 to one end of a link 54 whose other end is pivotally connected by a pin 56 to the upper portion of film support 16. Thus by suitably actuating handle 26, the parallel-motion means provided by bell cranks 28, 42, link 39 and links 32, 54, functions to move film support 16 into and out of its designed focal plane position at the exposure station E.

To cut the exposed end of the film F from the roll supply, a knife member 58 is slidably mounted for travel into and out of severing engagement with the leading end of the film. The general camera construction may be similar in structure and operation to that disclosed in U.S. Patent No. 1,832,656, issued November 17, 1931, to F. T. Powers.

FILM FEED MEANS

Figure 2:
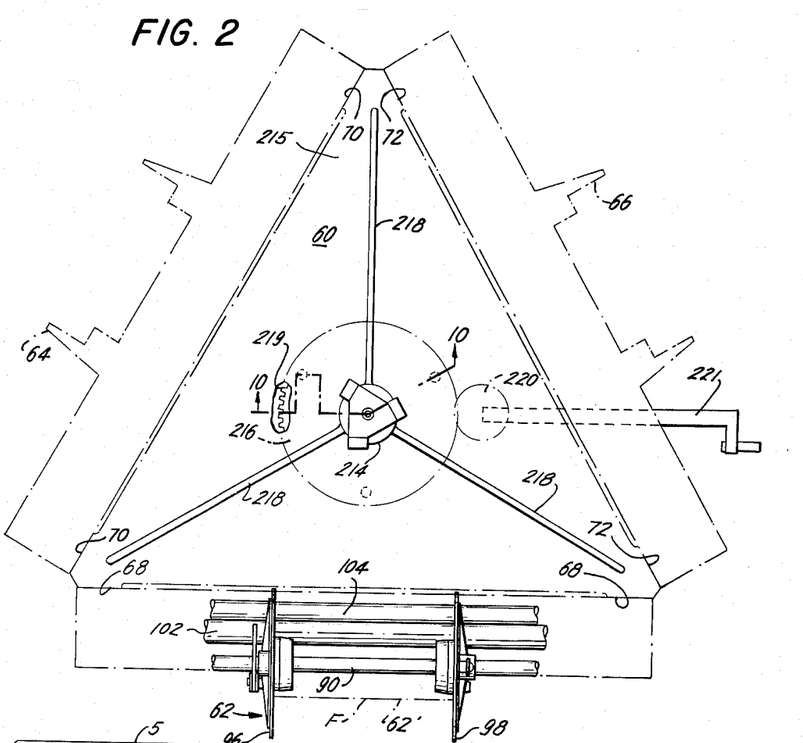
FIG. 2 is a fragmentary plan view, partly diagrammatic and partly in section, of an embodiment of the roll film supply magazine of the camera construction of FIG. 1.

Means are provided in the magazine or film-supply section 5 for carrying a plurality of film supply rolls and for selectively presenting them individually to a common film feed station. As here preferably embodied, this means comprises a rotatable and generally triangularly-shaped carriage 60 (FIG. 2) carrying thereon three spaced roll film holders 62, 64 and 66 (see FIG. 2). Each holder 62, 64 and 66 is mounted along an associated side 68, 70 and 72 of carriage 60 and the structure of each holder and its mounting and driving mechanism is identical with that of the other two. In the interest of brevity therefor, the structure of only one holder, 62, will be described.

Figure 3:
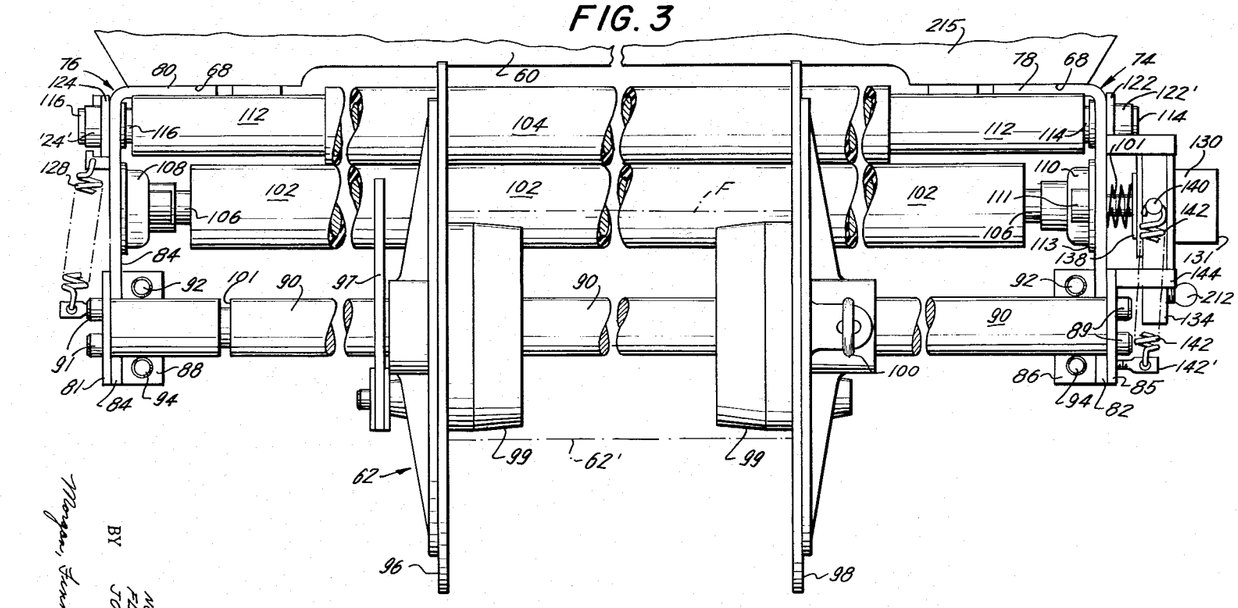
FIG. 3 is a fragmentary plan view of one of the individual roll film holders and its associated mechanism.
Figure 8:
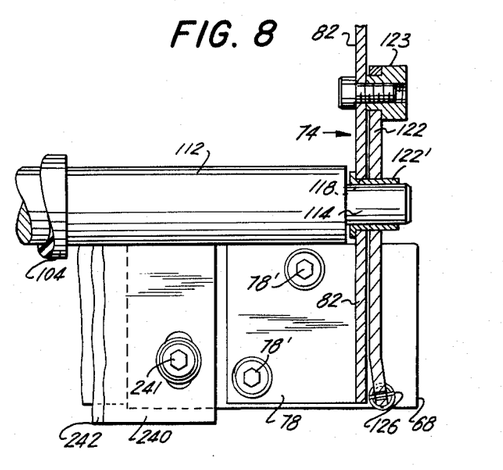
FIG. 8 is a fragmentary sectional view taken along line 8—8 of FIG. 5.

The mounting for film holder 62 includes, as depicted in FIG. 3, end support brackets 74 and 76 suitably rigidly bolted to side 68 of triangular carriage 60. Brackets 74 and 76 are, as here preferably embodied, L-shaped in plan (see FIG. 3) with the shorter legs 78 and 80, respectively, thereof, secured to side 68 of the carriage adjacent each end thereof by means of bolts 78' and 80', respectively (see FIG. 8).

The longer legs 82 and 84 of the brackets 74 and 76, respectively, are provided with shaft support blocks 86 and 88, respectively, upon which and upon the brackets 74 and 76 the film holder shaft 90 is rotatably supported at its ends. To keep shaft 90 in precise parallel alignment with the associated side 68 of the carriage unit 60, the support blocks 86 and 88 include pairs of spaced upright cap-screws 92 and 94, respectively, between which the ends of shaft 90 are substantially snugly disposed. To prevent axial movement of the shaft 90, thrust plates 85 and 87 are disposed in abutting relation to the shaft ends and are secured to the bracket legs 82 and 84, as well as to support blocks 86 and 88, respectively, by means of pairs of cap screws 89 and 91, respectively.

Shaft 90 is provided intermediate its ends with a pair of opposed disc members 96 and 98 between which the film roll 62' is lightly clamped. Each disc 96 and 98 includes a hub 99 upon which the roll 62' is axially mounted. In addition, each disc 96 and 98 is slidably mounded on shaft 90 so as to permit of loading the film holder 62 with film of different widths, and includes suitable releasable means for retaining it in a selected position along shaft 90. To this end and as here preferably embodied, disc 98 is provided with thumb-screw 100 engaging shaft 90, and disc 96 is provided with pivoted lever arm 97 for engaging the shaft in any one of a number of annular recesses such as the recess 101.

Also carried by brackets 74 and 76 are a pair of coated parallel film-feed pinch rollers 102 and 104. Roller 102 is a driving roller and roller 104 is an idler roller. The film from roll 62' is threaded downwardly therefrom between rollers 102 and 104 each of which is formed over a major portion of its length of a material having a high coefficient of friction such, for example, as rubber.

Driving roller 102 includes a reduced diameter core shaft 106 of metal, journalled at one end (its left-hand end as viewed in FIG. 3) in a suitable bearing 108 mounted to leg 84 of end bracket 76. The other end of core shaft 106 passes through and is journalled in bearing 110 which is bolted by bolts 111 passing through bolting flange 113 to leg 82 of bracket 74. Core shaft 106 terminates beyond the bearing 110 in a reduced diameter end portion 101 which, in turn, passes through an opening 103 in the bracket leg 82 (see FIGS. 3 and 7).

Figure 5:
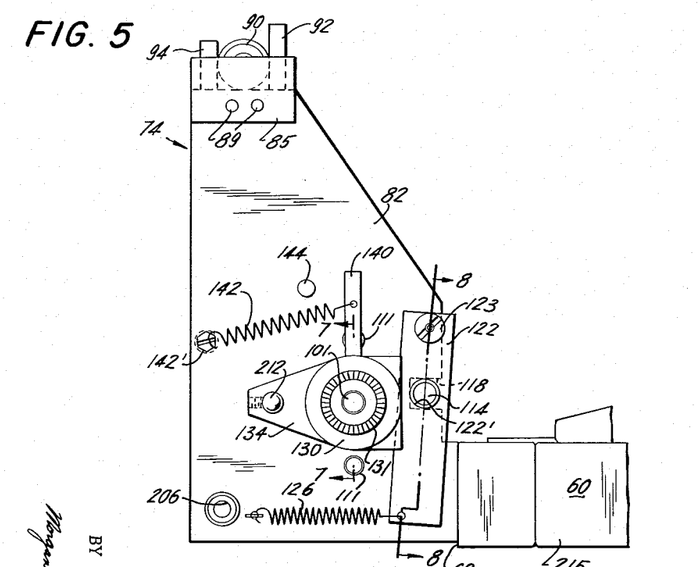
FIG. 5 is a fragmentary view in end elevation of the drive end of the roll film holder mechanism of FIG. 3 illustrating details of the film feed mechanism thereof.
Figure 6:
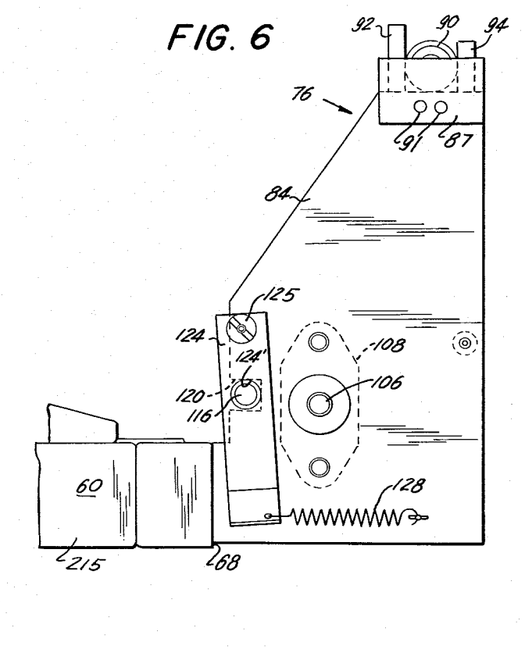
FIG. 6 is a fragmentary view in end elevation showing the opposite end of the roll film holder mechanism shown in FIG. 3.

Feed roller 104 includes a reduced diameter core shaft 112 of metal which terminates, at one end, in a reduced diameter end portion 114, and, at the other, in a reduced diameter end portion 116. As illustrated in FIGS. 5 and 6, the end portions 114 and 116 of core shaft 112 of roller 104 are seated in accommodating slots 118 and 120, respectively, formed in the bracket arms 82 and 84, respectively, and pass through suitable openings provided with journal bushings 122' and 124' seated in levers 122 and 124, respectively. Lever 122 is pivotally mounted at one end by means of a pivot bearing 123 to the bracket leg 82 while lever 124 is pivotally secured at its corresponding end to the bracket leg 84. The free ends of levers 122 and 124 are each connected by associated tensioning springs 126 and 128, respectively, to the bracket legs 82 and 84, respectively. Springs 126 and 128 are thus operative normally to resiliently bias idler feed roller 104 toward and into film feeding relationship with driving feed roller 102 and the film disposed therebetween (see FIG. 11A).

Figure 7:
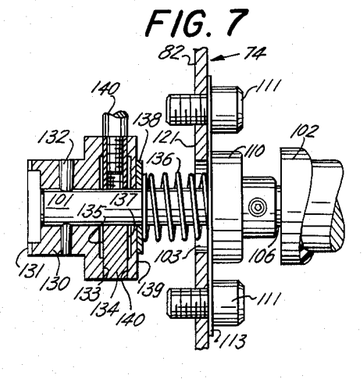
FIG. 7 is a fragmentary sectional view taken along line 7—7 of FIG. 5.

To rotate film feed pinch roller 102 and thus feed film from film roll 62', reduced end portion 101 of roller 102 is provided adjacent its end with an annular, toothed driven ratchet member 130 (see FIGS. 3, 5 and 7). Member 130 is adapted to be releasably engaged and driven by a mating toothed ratchet drive member 164 (see FIG. 14) located at the film feed station, as will be disclosed more fully hereinafter.

Figure 15:
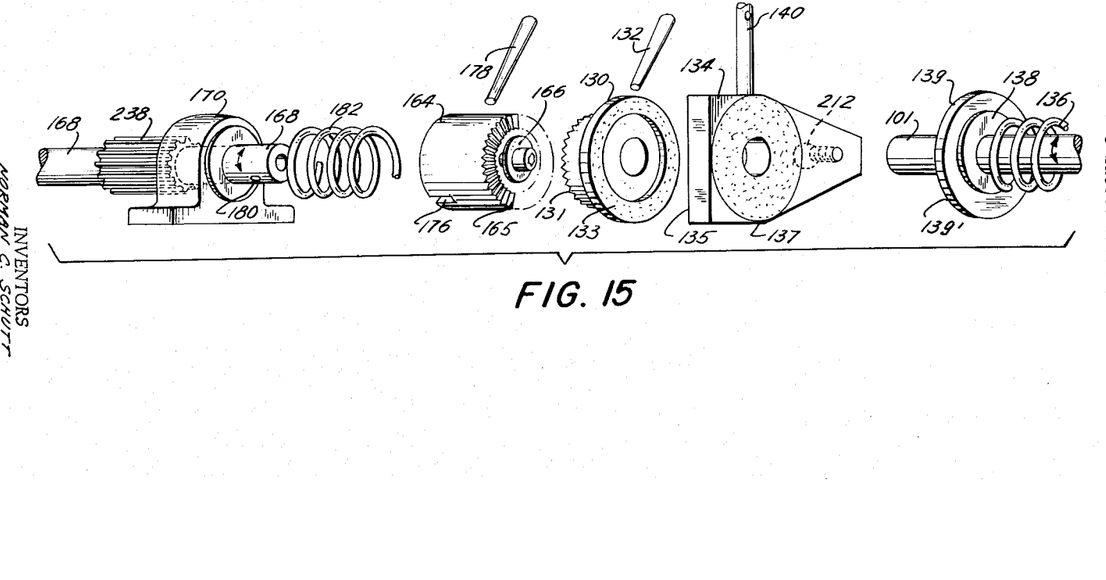
FIG. 15 is an exploded perspective view of a portion of the film feeding means of FIG. 14 with certain of the components drawn out upon their common axis.

Ratchet driven member 130 is provided at its outer end with an annular row of ratchet teeth 131 and is provided at its inner end with an annular friction surface face 133. It is secured to shaft end portion 101 of core shaft 106 by means of a tapered pin 132 which joins ratchet member 130 and shaft end portion 101 for conjoint rotation. Journalled on shaft end portion 101 and in engagement with friction face 131 of ratchet member 130 is a slip clutch plate 134 (see FIGS. 7 and 15) having annular friction surface faces 135 and 137. A coil spring 136 encircling shaft end portion 101 extends through opening 103 in bracket leg 82 into abutment, at one end, with bolting flanges 113 and, at the other, with a thrust washer 138. The latter, in turn, abuts clutch disc 139 which is journalled on the shaft and has an annular friction surface face 140 corresponding in size to the friction face 133 of ratchet member 130. Clutch disc 139 normally urges clutch surface 135 of plate 134 into contact with friction face 133 of ratchet member 130. Clutch plate 134 also includes a clutch lever 140 fixed to and extending radially from plate 134. The end of clutch lever 140 remote from plate 134 is connected to one end of clutch tension spring 142 whose other end is secured by a pin 142' to bracket leg 82. Clutch spring 142 normailly biases clutch lever 140 against a lever stop member 144 on bracket leg 82, thus retaining clutch plate 134 in its "at rest" position shown best in FIG. 11A.

At the film feed station in the magazine section 5, there is provided a film feed driving means (FIGS. 12 and 13), mounted to the magazine section and adapted to cooperate with the film roll feed means when the latter is positioned at the film feed station. The driving means, as here preferably embodied, comprises a stationary base plate 146 fixed to the bottom wall 148 of the magazine section housing and comprises also a pair of spaced upright parallel support plates 150 and 152 which extend upwardly from opposite sides of the base plate at one end thereof, and a pair of spaced upright parallel posts 154 and 156 which extend upwardly from the base plate at its other end. The posts support therebetween a pair of spaced upper and lower guide plates 158 and 160 which parallel the base plate and provide a cam track 162 therebetween.

The driving means also comprises means to rotate ratchet member 130 and hence film feed drive pinch roller 102. To this end there is provided a ratchet member 164 having an annular row of teeth 165 adapted to drivingly engage teeth 131 of ratchet 130 (see FIGS. 14 and 15). Ratchet 164 is secured by screw assembly 166 to one end of an actuating shaft 168 rotatably journalled in spaced bearings 170 and 172. The other end of shaft 168 passes through the sidewall 173 of the magazine housing and is provided with a suitable actuating handle 174.

It has been found desirable to provide a degree of resiliency for the inter-engagement of ratchets 130 and 164. This serves to compensate for any slight misalignment therebetween at the time of engagement and ensures positive engagement between the teeth 131 and 165 of ratchets 130 and 164, respectively. Therefore, ratchet 164 has an elongated axially extending slot 176 formed therein for accommodating a pin 178, which, in turn, is received in a cooperating radial opening 180 in shaft 168. A coil spring 182 encircles shaft 168 between bearing 170 and ratchet member 164 with one end bearing against journal bearing 170 and its other end bearing against a thrust washer 184 rotatably mounted on shaft 168 in abutting relation with the rear face 186 of ratchet 164. Spring 182 thus normally urges ratchet 164 axially toward its outermost position on shaft 168, to ensure positive driving engagement between the ratchet teeth 131 and 165.

Bearings 170 and 172 and drive shaft 168 are mounted for movement as a unit, generally designated 145, to move ratchet member 164 into and out of feeding engagement with the cooperating ratchet member 130 of the respective film roll holders 62, 64 or 66. Unit 145 is moved into engagement when it is desired that film is to be fed from the roll located at the film feed station and is moved out of engagement when the film magazine is to be rotated to present another film roll to the film feed station.

To mount this bearing-shaft unit 145 for movement into and out of operative feeding engagement with the film drive roller, bearings 170 and 172 are mounted on a bearing support plate 188 paralleling the base plate 146 and provided at one end with a freely-rotatable roller 190 running upon plate 160 for back and forth travel in cam track 162.

Figure 16:
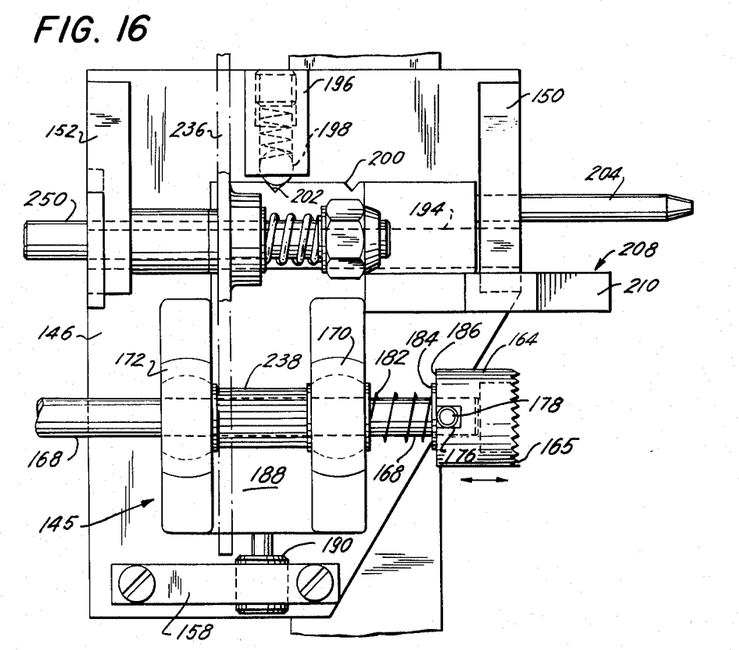
FIG. 16 is a fragmentary plan view of details of the film feeding means shown in FIG. 14.
Figure 17:
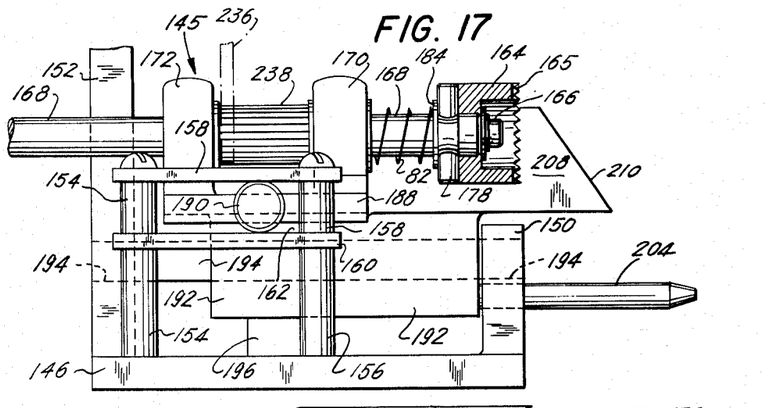
FIG. 17 is a fragmentary view in side elevation of the means illustrated in FIG. 16.

The opposite end of bearing plate 188 has a downwardly depending generally rectangular block 192 fixed thereto which is axially slidably mounted on a stationary shaft 194 paralleling the base plate 146 and carried by upright plates 150 and 152. It will be apparent that the carriage structure is thus supported at one end by the plate 160 and at the other by the shaft 194, for reciprocating movement in the direction of the arrows, FIG. 16.

Figure 14:
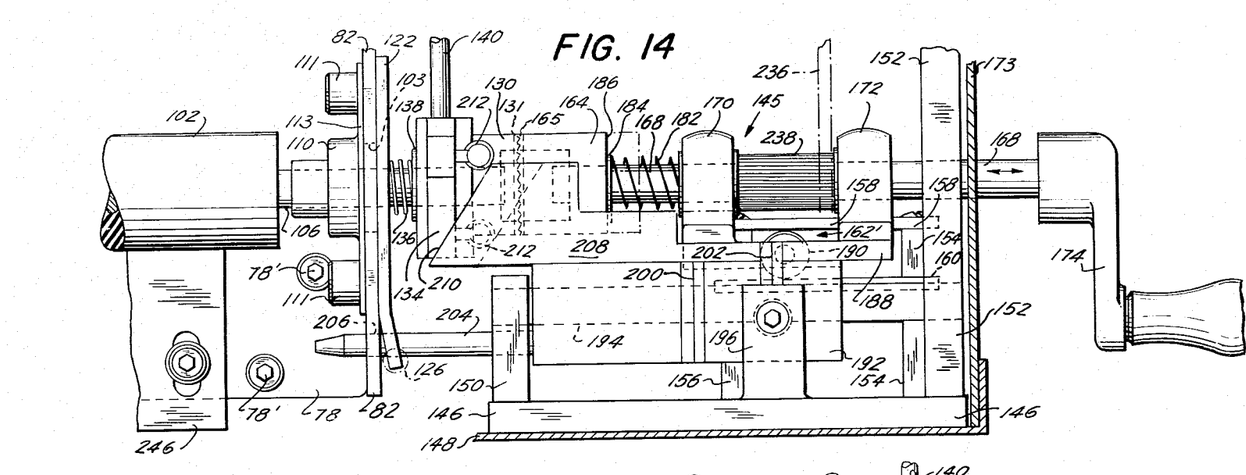
FIG. 14 is an enlarged view of details of the film feeding means shown in FIG. 12.

To selectively retain unit 145 in either its operative forward, feeding position as depicted in FIG. 14 or in its non-operative, rearward, position, as depicted in dash-dot lines in FIG. 14, there is provided a retainer member including a post 196 affixed to plate 146 and provided with spring-biased ball detent 198 adapted to seat in V-groove 202 in post 192 when unit 145 is in forward operative position and in V-groove 200 in post 192 when unit 145 is in rearward inoperative position.

To align the magazine feed unit 145 with the roll feed means so as to ensure proper engagement of ratchets 130 and 164, slide block 192 is provided with a forwardly projecting rigid aligning pin 204 which passes slidably through upright support plate 150 and is adapted to be received in an accommodating aperture 206 in bracket leg 82. Entry of pin 204 into aperture 206 as unit 145 is moved into forward feed position, aligns ratchets 130 and 164 for driving engagement at the start of the film feed and locks the magazine carriage 60 in place.

To cooperate with clutch plate 134, unit 145 is provided with a forwardly projecting cam member 208 forming an extension of bearing plate 188 and paralleling drive shaft 168. Cam member 208 terminates at its outer end in an inclined cam face 210 formed thereon and adapted to engage a cooperating ball follower 212 fixed to clutch plate 134 as unit 145 is moved toward operative position, rotating clutch plate 134 on shaft end portion 101 from inoperative position as in FIG. 11A to operative position, as in FIG. 5, for reasons described in detail hereinafter.

OPERATION

Figures 9, 10:
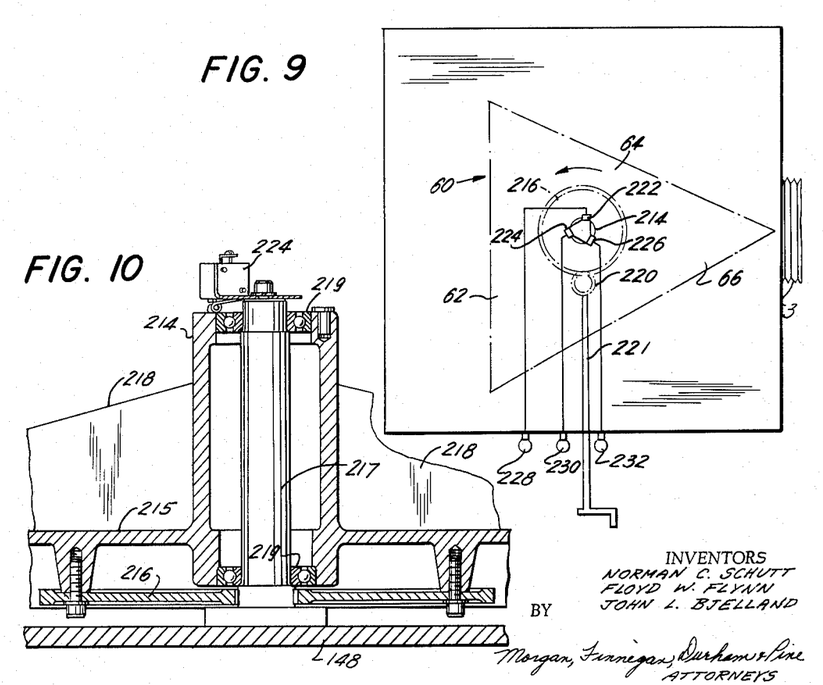
FIG. 9 is a semi-diagrammatic plan view of the camera magazine construction of FIG. 2 including a schematic wiring diagram of the visual indicator circuit for indicating which one of the roll film holders is at the film feed station.
FIG. 10 is a fragmentary sectional view taken along line 10—10 of FIG. 2 showing details of the film supply magazine rotational bearing construction.

The rotatable carriage or magazine 60 upon which the film holders 62, 64 and 66 are mounted comprises a base plate 215 (FIG. 10) to which is fixed a toothed spur gear 216. The base plate has a central hub 214 equipped with bearings 219 by which the plate is rotatably mounted axially on a central upright axle shaft 217 secured to the bottom wall structure 148 of the magazine section 5. Preferably, the plate 215 is suitably reinforced by radial gusset 218.

Magazine 60 is rotated about shaft 217 by means of angled spur gear 220 which is in meshing engagement with the teeth 219 of spur gear 216. Gear actuating shaft 221 is suitably rotated to rotate magazine 60 and present the desired film roll holder 62, 64 or 66 to the film feed station. One of the switches 222, 224, 226 associated with rolls 62, 64 and 66 respectively completes a circuit to an associated indicator light 228, 230, 232, respectively, to indicate to the operator which of the film rolls is located at the film feed station.

With the desired film roll at the film feed station, unit 145 is manually moved axially inwardly into operative film feeding position by pressure exerted on handle 174. As unit 145 is moved toward film feeding position, aligning pin 204 enters opening 206 to ensure alignment of the feed unit 145 and the roll feed means.

Unit 145 is moved inwardly until ratchets 130 and 164 are in full meshing engagement and pin 204 fully seated.

During this movement, the inclined cam face 210 of the axially reciprocable cam member 208, engages the ball shaped cam follower 212 as is indicated by the dash-dot line positions of the cam member and follower in FIG. 14. At this instant and as best shown in FIG. 11A, the clutch plate 134 with its follower 212 is in the position shown in FIG. 11A. It is normally held in this position by the clutch plate return spring 142 acting on the clutch plate pin or lever arm 140 to hold the latter against the lever arm stop member 144.

As the cam member 208 continues its advance, the follower 212 rides up the inclined face 210 thus rotating the clutch plate clockwise as viewed from the handle end of unit 145 in FIG. 14. This clockwise movement terminates when the unit 145 arrives at its innermost solid line position depicted in FIG. 14, at which time the follower 212 is in the solid line position shown in FIG. 14. An intermediate stage of the movement of the clutch plate is depicted in FIG. 5 and it will be understood that the degree of angular movement of the clutch plate may be fixed as desired by imparting to the cam face 210 an inclination which is most suitable and practicable to the end that the feed roller shaft 106 with its pinch roll 102 may be given a desired initial degree of rotation.

It will be apparent from FIG. 7 that, as the clutch plate 134 is rotated, axial pressure exerted by the clutch coil spring 136 against the thrust washer 138 will be transmitted to the clutch disc 138 and, by the latter, through the clutch plate 134 to the ratchet member 130 pinned to the core shaft 101 of the pinch feed roller 102. Because of the friction surfaces 133, 135, 137 and 139′ of the ratchet member 130, clutch plate 134 and clutch disc 139, the torque imparted to the clutch plate 134 by the cam member 208 is imparted to the ratchet member 130. Since the ratchet member is pinned to the shaft 101 there will thus be an initial angular movement of the latter before the ratchet teeth 131 and 165 come into driving engagement with each other.

Figure 4:
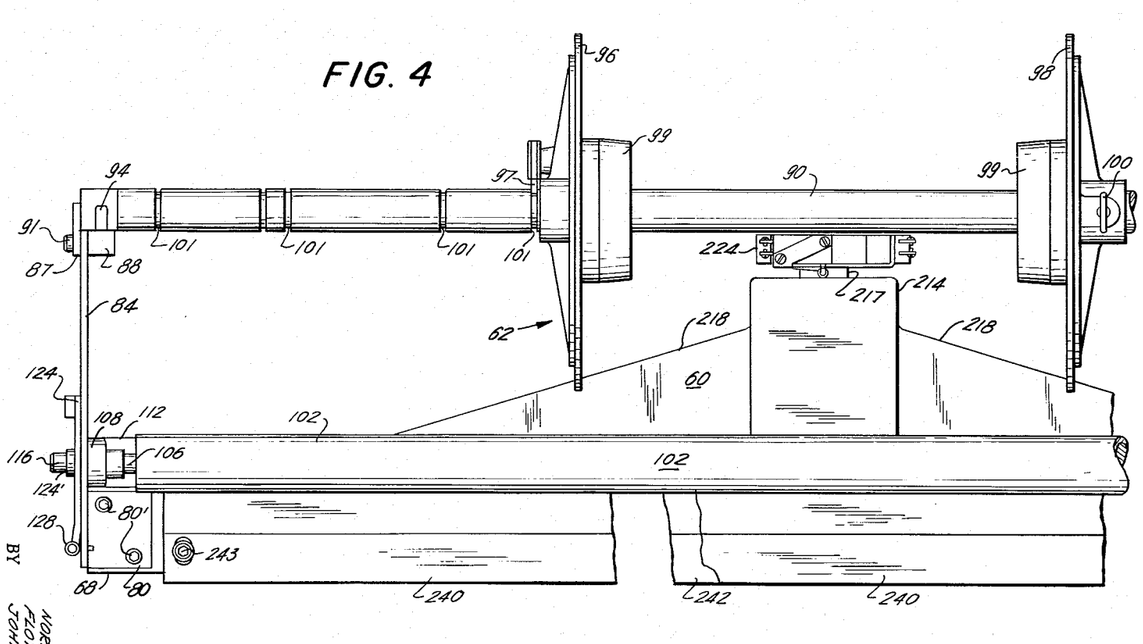
FIG. 4 is a fragmentary view in elevation of the roll film holder shown in FIG. 3 and of a portion of the film supply magazine.

The film F is mounted as a roll on the film holder 62, FIG. 11A, and is threaded downwardly between the pinch feed rollers 102 and 104. Below the feed rollers the film is threaded between a pair of film guide plates 240 and 242 vertically adjustably mounted to the associated ends 68 of the magazine carriage 60 by bolts 241 and 243 (see FIGS. 4 and 8). Advantageously, the guide plates 240 and 242 diverge from each other from generally their longitudinal median line to their top or inlet edge so as to provide a funnel shaped film inlet passage portion 244 leading to a film outlet passage portion 245 which is preferably of uniform width lengthwise of the guide plates. This funnel-shaped inlet portion facilitates initial threading of the film between the guide plates as it emerges from between the pinch rolls 102 and 104.

It will be observed from FIG. 11A that with the clutch plate 134 in its normal "at rest" position, the leading edge of the film F is flush or substantially flush with the bottom edges of the guide plates and disposed directly above, but in vertically spaced relation to, a film slot 246 which traverses the bottom wall 148 of the magazine section 5 and the top wall 248 of the camera section 2. The slot 246 directly overlies the knife 58. Thus, since the leading edge of the film is normally clear of the slot 246, the magazine carriage 60 is normally free to be rotated on an axle shaft 217 when the film feed unit 145 is in its normally disengaged position. However, when the clutch plate 134 is rotated by the inward engaging movement of the unit 145, the leading edge of the film F is caused to be advanced downwardly through the film feed slot 246 which marks the feeding station, for a distance sufficient to place the leading edge of the film, that is, the free end of the film in alignment with the cutting edge of the knife 58.

Figure 12:
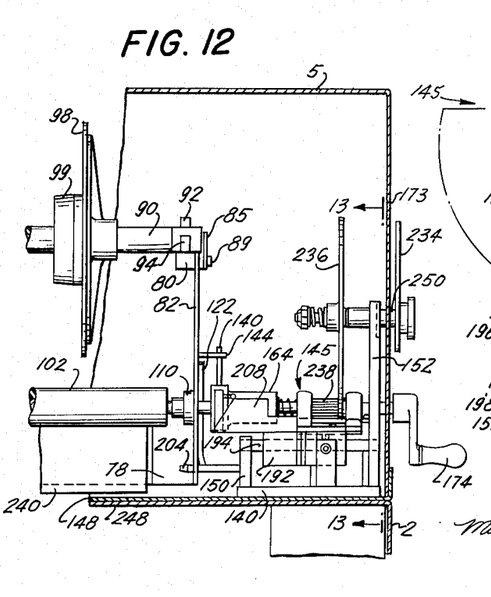
FIG. 12 is a sectional view taken along line 12—12 of FIG. 11A and showing details of the film-feeding mechanism of this invention.
Figure 13:
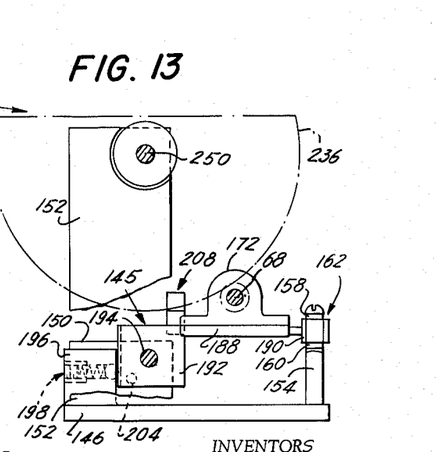
FIG. 13 is a sectional view taken along line 13—13 of FIG. 12.

With ratchets 130 and 164 in meshing engagement, handle 174 is rotated until a measured length of film is unrolled from the associated film roll and moved into juxtaposition with the film support 16. The length of film unrolled is determined by reference to an external settable indicator shaft 234 keyed to shaft 250 slidably carrying spring-pressed gear member 236, which, in turn, is in sliding meshing engagement with a suitable gear element 238 slidably axially keyed on shaft 168 between the bearings 170 and 172 (FIG. 12).

When the desired amount of film has been fed as shown by indicator 234, knife element 58 is actuated by suitable actuating means (not shown) to sever the film from its associated roll supply.

It is necessary to ensure the retraction of the leading end of the film into the magazine section 5 in the event it is desired to rotate the magazine carriage 60 to change to a different type of film for use in camera section 2. Accordingly when ratchet members 130 and 164 disengage as unit 145 is moved out of film feed position, clutch plate 134 is released by cam member 208, permitting clutch plate return spring 142 to return clutch return lever 140 to position against stop 144. Since plate 134 is in normal functional engagement with ratchet 130 by means of cooperating faces 133 and 135, return of clutch plate 134 to its "at rest" position against stop 144 rotates pinch roller 102, thus withdrawing the free end of the film F through the aperture 246 into the magazine section 5 and so clearing the film station for the next film roll to be indexed to the film supply station.

Other advantages will be learned by practicing the invention, and it will be understood that changes may be made from the exact structures shown and described without departing from the principles of the invention and without sacrificing its chief advantages.

What is claimed is:

1. A photomechanical camera comprising: a support adapted to hold a plurality of film supply rolls; means mounting said film rolls on said support in spaced relation to each other, for rotation about coplanar central axes; means mounting said support for rotation about an axis transverse to said coplanar film roll axes for presenting a selected one of said film rolls to a film feed station; means at said station for unwinding film from said selected film roll; means at said station for directing the leading end of film unwound from the selected roll into the exposure zone of said camera; means at said station for severing a selected length of the unwound film from the selected roll; means for supporting said severed film length in said exposure zone for exposure therein; and means for exposing said supported length.

2. The camera as defined in claim 1 including means for automatically rewinding the film from which said length has been severed, preparatory to rotation of said support to move said selected roll away from said film feed station.

3. A photomechanical camera comprising: a magazine adapted to hold a plurality of supply rolls of light-sensitive material thereon; means mounting said rolls on said magazine in spaced relation to each other for rotation about generally horizontally-disposed central axes; means mounting said magazine for rotation about a generally vertical central axis to travel said rolls to and away from a film feed station; means at said station adjacent the focal plane of said camera for unwinding film from a selected roll positioned at said station; means for guiding the leading end of film unwound from said roll into the focal plane of said camera; means at said station for severing a selected length of said unwound film from the selected film roll; means for supporting said severed film length in said focal plane; and means for exposing said supported length.

4. A photomechanical camera comprising a rotatable magazine adapted to hold a plurality of supply rolls of light-sensitive material; individual means on said magazine for individually mounting said rolls in spaced relation to each other for rotation about their respective transverse central axes; means for rotating said magazine to travel said rolls to and away from a film feed station adjacent the focal plane of said camera; individual transport means on said magazine associated with the respective roll mounting means for unwinding said light-sensitive material from a selected supply roll positioned at said feed station; roll feed means at said feed station releasably engageable with the transport means of a supply roll positioned at said feed station, for driving said transport means; means associated with said magazine for directing the leading end of said material unwound from the selected roll into the focal plane of said camera; means at said feed station for severing a selected length of the unwound material from said selected roll; means for supporting said severed length in said focal plane, and means for exposing said supported length.

5. The camera as defined in claim 4, said transport means including a clutch element for automatically rewinding the light-sensitive material from which said length has been severed, upon release of engagement of said roll feed means with said transport means.

6. A photomechanical camera comprising a magazine adapted to hold a plurality of film supply rolls; means on said magazine for individually spacedly mounting said rolls on said magazine for rotation about generally horizontally disposed central axes; means mounting said magazine for rotation about a generally vertical central axis to travel said rolls to and away from a film feed station adjacent the focal plane of said camera; individual transport means on said magazine associated with the respective roll mounting means for unwinding film from a selected film supply roll positioned at said feed station; roll feed means at said feed station releasably engageable with the film transport means of a film supply roll positioned at said feed station, for driving said transport means; means associated with said magazine for guiding the leading end of film unwound from the selected roll into the focal plane of said camera; means at said feed station for severing a selected length of the unwound film from said selected roll; a vacuum film support for supporting said severed selected length in said focal plane; means movably mounting said film support for movement into and out of film support position in said focal plane; and means for exposing said supported length.

7. The camera as defined in claim 6, said transport means including a resiliently-biased return feed member, and means connecting said return feed member to its associated roll mounting means for retracting the free end of the unwound film upon release of engagement of said roll feed means with said transport means.

8. The camera as defined in claim 6 wherein said transport means individually comprise a pair of feed pinch rollers for each of said film supply rolls, means rotatably mounting said feed pinch rollers on said magazine to receive the leading end of film unwound from the associated roll and normally disposed therebetween, one of said feed rollers including a first toothed ratchet member, and wherein said roll feed means includes: a second cooperating toothed ratchet member at said film feed station, means mounting said second ratchet member for reciprocating movement into and out of operative engagement with said first toothed ratchet member of a feed roller positioned at said film feed station, and means for rotating said second toothed ratchet member when in operative engagement whereby rotation thereof is transmitted by said first ratchet member engaged thereby in operative position to rotate said feed rollers thereby unwinding film from the selected roll at said film feed station.

9. The camera as defined in claim 8 wherein said transport means includes: a clutch element associated with said first toothed ratchet member, means freely mounting said clutch element on said one feed roller and contiguous to said first ratchet member, spring means normally axially biasing said clutch element and said first ratchet member into frictional driving engagement, a second spring means normally biasing said clutch element in a direction opposite to the direction of rotation of said feed rollers during unwinding, and a cam follower means on said clutch element, and wherein said roll feed means includes: cooperating cam means on said second toothed ratchet member for driving said follower means to rotate said clutch element in the direction of rotation of said feed roller against the action of said second spring means prior to engagement of said ratchet members, whereby said second spring means is operative upon disengagement of said ratchet members to rotate said feed rollers in the opposite direction through said spring-biased clutch element in said first ratchet to rewind film unwound from the selected roll prior to indexing said magazine on its vertical axis.

10. A roll film sheet dispenser comprising in combination a light-tight housing having a passageway, a plurality of rotatably mounted film rolls, a support for said film rolls, means mounting said support for rotation about a central axis transverse to the axes of rotation of said rolls thereon, means for rotating said support to travel a selected roll to said passageway, means at said passageway for unwinding a selected length of film from said selected film roll, means for directing the leading end of the film into the passageway, and means for severing the film into pre-determined lengths.

11. The dispenser as defined in claim 10 including means for automatically rewinding said unwound roll preparatory to rotation of said support to move said selected roll away from said passageway.

12. A roll film sheet dispenser comprising in combination a light-tight housing having a passageway, a plurality of rotatable film rolls, a support for said film rolls, means mounting each of said rolls on said support for rotation about a generally horizontal central axis, means mounting said support for rotation about a generally vertical central axis, means for rotating said support to travel a selected roll to said passageway, roll feed means at said passageway, means on each of said rolls releasably engageable with said roll feed means for unwinding film from a selected roll positioned on said magazine at said passageway, means for directing the leading end of said unwinding roll into said passageway and means for severing a selected length from the leading end of said unwinding film roll, means for supplying said severed film length into the focal plane of said housing and means for exposing said supported length.

13. The dispenser as defined in claim 12 including a return feed element and unwinding means on said rolls for rewinding said unwound roll upon release of engagement thereof with said roll feed means.

14. The dispenser as defined in claim 12 including an indicator and means connecting said indicator to said roll feed means and adapting said indicator to move in response to actuation of said roll feed means for indicating the length of film unwound from said roll.

15. A roll film dispenser comprising a light-tight housing having a passageway therein, a magazine adapted to hold a plurality of spaced film supply rolls, means mounting said film rolls on said magazine for rotation about generally horizontally-disposed central axes, means mounting said magazine for rotation in said housing about a generally vertical central axis to travel said rolls to and away from said passageway, roll feed means at said passageway, a pair of feed rollers for each of said rolls, means rotatably mounting said feed rollers on said magazine with the leading end of the film of the associated roll normally disposed therebetween, feed actuating means on one of said feed rollers including a first toothed ratchet member, a second cooperating ratchet member at said passageway, means mounting said second ratchet member for selected sliding movement into and out of operative engagement with the cooperating ratchet member on a feed roller positioned at said passageway, said mounting means including cam means for rotating said first ratchet member prior to operative engagement of said ratchet members to rotate said feed rollers through a limited angle thereby to feed the leading end of said film into said passageway.

16. The dispenser as defined in claim 15 including a clutch element, means freely mounting said clutch element on one of said feed rollers and contiguous to said first ratchet member, spring means normally axially biasing said clutch element and said first ratchet member into driving engagement, a second spring means normally biasing said clutch element in a direction opposite to the direction of rotation of said feed rollers during unwinding, cam means on said second ratchet member mounting means, and cooperating cam follower means on said clutch element adapted to rotate said clutch element on said feed roller against the action of said second spring means when said ratchet members are in engagement, whereby said second spring means is operative upon disengagement of said ratchet members to rotate said feed rollers through said spring-biased clutch and said first ratchet to rewind the leading end of the unwound roll.

17. The dispenser as defined in claim 15 including an indicator and means connecting said indicator to said second ratchet and adapting said indicator to move in response to rotation of said second ratchet for indicating the length of film unwound from said roll.

References Cited by the Examiner
UNITED STATES PATENTS

| 1,754,890 | 4/1930 | Hershberg | 88—24 |
| 2,245,606 | 6/1941 | Rauch | 95—31 |

FOREIGN PATENTS 852,805  11/1952  Germany.

NORTON ANSHER, *Primary Examiner.*